United States Patent [19]

Foster et al.

[11] Patent Number: 5,556,257

[45] Date of Patent: Sep. 17, 1996

[54] INTEGRALLY BLADED DISKS OR DRUMS

[75] Inventors: Derek J. Foster; Peter J. Gillbanks; Keith C. Moloney, all of Bristol, England

[73] Assignee: Rolls-Royce plc, London, England

[21] Appl. No.: 352,867

[22] Filed: Dec. 2, 1994

[30] Foreign Application Priority Data

Dec. 8, 1993 [GB] United Kingdom .................... 9325135

[51] Int. Cl.⁶ ........................................................ F01D 5/14
[52] U.S. Cl. ..................... 416/241 R; 416/234; 29/889.23
[58] Field of Search ................................. 416/234, 241 R; 415/173.4; 29/889.2, 889.23, 889.7

[56] References Cited

U.S. PATENT DOCUMENTS

| 3,730,644 | 5/1973 | Jubb ....................... 416/241 R |
| 3,885,294 | 5/1975 | Chaundy et al. ................ 29/889.7 |
| 4,436,485 | 3/1984 | Vonnegut ..................... 416/241 R |
| 4,479,293 | 10/1984 | Miller et al. ................. 416/241 R |
| 4,536,932 | 8/1985 | Athey ........................ 416/241 R |
| 4,581,300 | 4/1986 | Hoppin, III et al. ............. 29/889.2 |
| 4,610,698 | 9/1986 | Eaton et al. . |
| 4,659,288 | 4/1987 | Clark et al. .................. 29/889.23 |
| 4,851,188 | 7/1989 | Schaefer et al. . |
| 4,884,820 | 12/1989 | Jackson et al. . |
| 5,059,095 | 10/1991 | Kushner et al. ................ 29/889.23 |

FOREIGN PATENT DOCUMENTS

| 2853959 | 6/1979 | Germany ..................... 415/173.4 |
| 0363297 | 12/1931 | United Kingdom ............... 416/241 R |
| 2004906 | 4/1979 | United Kingdom . |
| 2121884 | 1/1984 | United Kingdom . |
| 2130927 | 6/1984 | United Kingdom . |
| 2153447 | 8/1985 | United Kingdom . |
| 2210572 | 6/1989 | United Kingdom . |
| 2224862 | 5/1990 | United Kingdom . |
| 2242848 | 10/1991 | United Kingdom . |
| 2268430 | 1/1994 | United Kingdom . |

Primary Examiner—Edward K. Look
Assistant Examiner—Mark Sgantzos
Attorney, Agent, or Firm—Oliff & Berridge

[57] ABSTRACT

A method of making an integrally bladed disc for a gas turbine engine, the disc having at least one blade the radially outermost surface of which is coated with a material harder than that of the blade, the method comprising the steps of: providing a forged disk blank of a first material; friction surfacing at least part of the circumference of the blank with a second material harder than the first material; and machining the blank so as to provide an integrally balded disc wherein the radially outermost surface of at least one blade is coated with said second material.

13 Claims, 1 Drawing Sheet

INTEGRALLY BLADED DISKS OR DRUMS

This invention relates to the manufacture of integrally bladed disks or drums. In particular it concerns the provision of wear resistant tips for the blades of such components.

BACKGROUND OF THE INVENTION

It is known to cast, forge or otherwise manufacture integrally bladed disks for use in compressor or turbine rotors in gas turbine engines especially for aircraft. Several techniques are known in the art for forming integrally bladed rotor disks, the present invention is adapted for use with those techniques in which the blades are formed in situ from solid as opposed to being formed separately and joined to the rotor. In the present context integrally bladed rotor disks shall be construed as including not only single stage disks (known as blisks) but also multi-stage assemblies either joined together or formed integrally, single stage integrally bladed rings (known as blings) and multi-stage bladed ring or drum assemblies (known as blums).

It is also well known to provide blades with abrasive tips so that if, or where, they come close to a surrounding portion of an engine casing the blade tips can cut a wear track in an encircling liner specially provided for the purpose. By this technique radial clearance gaps can be minimised to reduce overtip gas leakage and thereby improve engine efficiency. Suitable coating deposition methods for applying selectively a coating of a hard first material to a surface of a body comprised of a second, relatively softer material are known under the generic term of friction surfacing, and are described in British patent documents GB 2268430, GB 2242848, GB 2224682 and GB 2210572. However, other techniques of applying surface coating may be employed such as for example plasma spray coating.

Hitherto the hard or abrasive tips have been applied to blades individually as taught for example in British Patent Application 2153447. This is a time consuming and therefore expensive operation since each blade is treated separately. The present invention is intended to overcome this drawback by applying the hard tip facing to all blades in the assembly, in effect, simultaneously.

SUMMARY OF THE INVENTION

According to a first aspect of the present invention there is provided a method of making an integrally blade disc of the kind in which at least some of a multiplicity of integrally formed blades spaced apart around the disc and consisting of a first material are provided with a tip coating of a second material, comprises the steps of:

forming a blank of the first material to a part finished state prior to the forming of the blades, applying to selected portions of the surface of said blank a coating of the second material, and subsequently forming the blades.

Preferably, the method comprises applying the coating of the second material to a portion of the surface of the disc blank corresponding to the radially outermost tips of the blades.

The coating step is preferably a friction surfacing process but other techniques such as for example plasma spraying of electro-plating may be employed.

According to a second aspect of the present invention there is provided an integrally bladed disc for a gas turbine engine in which the radially outermost surface of at least one blade, being a blade made of a first material, is coated with a second material harder than the first material.

Preferably, the second material may be selected from the group consisting of carbides of tungsten, silicon and chromium, or from the group consisting of titanium carbide, titanium nitride and silicon nitride, or may be a metal oxide. Also the first material of which the blade is made may be selected from the group consisting of titanium, titanium base alloys, nickel-based alloys, and steel.

BRIEF DESCRIPTION OF THE DRAWINGS

The invention will now be described by way of example only with reference to the accompanying diagrammatic non-scale drawings in which.

DESCRIPTION OF THE PREFERRED EMBODIMENTS

Figure 1:
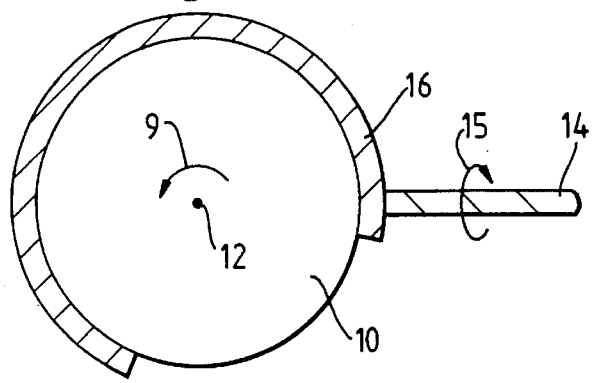
FIGS. 1 and 2 are cross-section views along the longitudinal axis of a turbine engine compressor section of successive stages in the making of a blisk according to the method of the invention.

Referring to FIG. 1 there is shown a section through a circular disk blank comprising a titanium alloy forging 10 which is a first stage in the manufacture of a blisk. According to the known manufacturing process the circular forged blank 10 is mounted for rotation about an axis on, for example, a CNC milling machine. The disk periphery is presented to a milling cutter on the machine turret which mills-out the slot between adjacent blades. When one stage is completed the disk is indexed around to a new position and the milling process repeated. This procedure is repeated until all the required inter-blade slots are formed. The blisk now comprises a hub, or mounting disk, and a complete set of integral blade blanks spaced apart around its circumference. It is unlikely that the blades can be milled directly to finished form. Therefore a further stage of operation is required to finish the blades, such as electron discharge machining in which an EDM tool is run over each blade to remove unwanted metal from its surfaces and edges.

In known processes when the blades are required to carry abrasive tips the hard abrasive material is applied to the finally formed blades. According to the invention the "tipping process", that is the application of the hard abrasive material, is carried out at a much earlier stage of the blisk manufacturing procedure before the individual blade blanks are formed. This second hard material is applied to the required face or faces of the disk while still in its blank stage. The preferred method, but not necessarily the sole method is to apply the second material to the selected surface of surfaces of the blisk blank 10 of forged first material by friction surfacing.

In the case of a blisk for an axial flow rotor stage where the blades extend outwards more or less radially from the circumference of the disk the abrasive coating is required on the radially outer ends of the blades. Therefore, as illustrated schematically in FIG. 1 of the drawings the forged disk blank 10 is mounted on an axle 12 and the forging is rotated in the direction of arrow 9. Meanwhile a rod 14 of the second material is pressed against the circumference of the blank 10 and rotated in the direction of arrow 15. The rod 14 may consist of titanium carbide for example. As the rod 14 is urged against the blank 10 and rotated its tip heats up and, in effect, a layer of the second material is friction welded to the circumference of the blank. As the blank 10 is rotated more slowly about its axis 12 a layer 16 of hard titanium carbide is deposited around the entire circumference of the softer titanium alloy blank 10.

Figure 2:
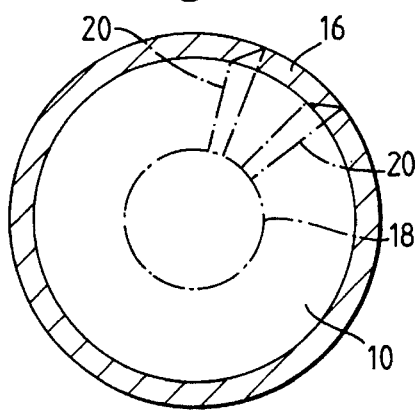

FIG. 2 shows a section through a surface coated blank made by the method of FIG. 1 together with in dotted outline the central disc or hub 18 and some of the blades 20 of the final integrally bladed disc. It will be seen that the tips of the blade outlines 20 are capped by the hard surface coating 16.

Figure 3:
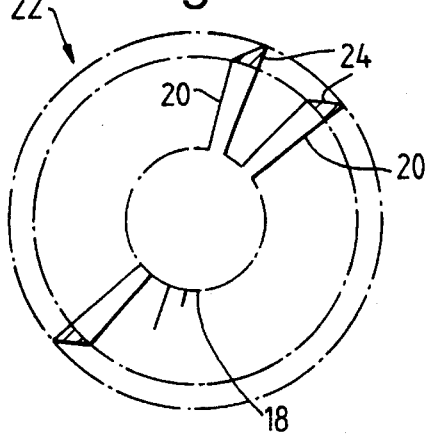
FIG. 3 is a cross section view of a blisk made according to the method of the invention.
Figure 4:
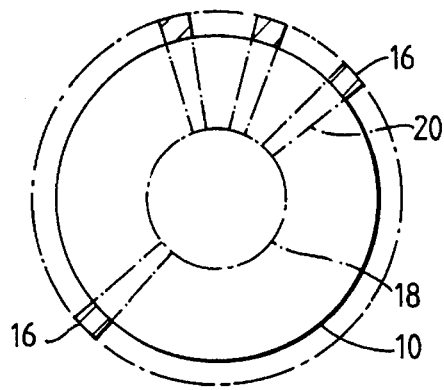
FIG. 4 is a view similar to FIG. 2 showing the second material deposited on selected portions of the circumference of the blank.

FIG. 3 illustrates the final step of the method in which the inter-blade slots are milled into the forged blank along the dotted outlines of FIG. 2. The end result is an integrally bladed disc 22 of titanium alloy comprising the central disc or hub 18 and a multiplicity of blades 20 (only some of which are shown), the radially outermost tips 24 of which are capped by the hard titanium carbide deposited on the original cylinder by the friction surfacing.

As previously mentioned these "blades" may be blade blanks which requires a final operation eg EDM to produce an aerofoil profile.

In a modification of the invention instead of depositing the second material as a continuous circumferential layer it may be deposited only to coincide with the later to be formed blades tips. Thus the friction surfacing rod 14 may be lifted-off the surface of the disk blank where the hard coating is not required. This will minimise the use of the friction surfacing material and render it easier to mill the final coated forging, as the harder second material is likely to cause more tool wear than the softer first material of the blank.

It will be appreciated that materials other than titanium carbide may be used as the friction surfacing material. Silicon nitride or titanium nitride may be contemplated for high temperature requirements. For applications in the medium to lower temperature range it may be more appropriate to use a material such as tungsten carbide, silicon carbide, or chromium carbide. Others materials may be a metal oxide such as alumina or boron nitride. The rod 14 may comprise one or more of the harder second material suspended in a matrix of softer material. For example a nickel alloy matrix could be used to coat abrasive material onto a nickel alloy disk blank.

The choice of friction surfacing material will also depend on the material of the forging 10. Although titanium alloy is exemplified above for this purpose, it will be understood that materials such as steel, nickel-base alloys, or even pure titanium may be appropriate as the material of the forging 10, depending on the application for which the bladed disc is intended.

In some engines not all blades need to be abrasively tipped and therefore only one or a small number of blades of tips are hard-faced according to the invention. It will also be appreciated that although the invention has been described above in the context of an axial flow, radially extending bladed rotor it may also be applied to radial flow or centrifugal rotors. The tip coating or second material may be simply a hard wearing material rather than an abrasive material.

We claim:

1. A method of making an integrally bladed disc in which at least some of a multiplicity of integrally formed blades spaced apart around the disc and consisting of a first material are provided with a tip coating of a second material, the method comprising the steps of:

forming a blank of the first material to a part finished state prior to the forming of the blades;

applying to selected portions of a surface of said blank a coating of the second material; and subsequently forming the blades.

2. The method as claimed in claim 1, wherein the coating of the second material is applied to a portion of the surface of the disc blank corresponding to radially outermost tips of the blades.

3. The method as claimed in claim 1, wherein the coating of the second material is applied to a portion of the disc blank surface corresponding to at least one blade.

4. The method as claimed in claim 1, wherein the coating step is a friction surfacing process.

5. The method as claimed in claim 1, wherein the second material is selected from the group consisting of carbides of tungsten, silicon and chromium.

6. The method as claimed in claim 1, wherein the second material is selected from the group consisting of titanium carbide, titanium nitride and silicon nitride.

7. The method as claimed in claim 1, wherein the second material is a metal oxide.

8. The method as claimed in claim 1, wherein the first material of which the blade is made is selected from the group consisting of titanium, titanium-based alloys, nickel-based alloys, and steel.

9. An integrally bladed disc for a gas turbine engine in which a radially outermost surface of at least one blade of a multiplicity of integrally formed blades spaced apart around the disc and comprised of a first material, is coated with a second material harder than the first material is manufactured by the method as claimed in claim 1.

10. The disc as claimed in claim 9, wherein the second material is selected from the group consisting of carbides of tungsten, silicon and chromium.

11. The disc as claimed in claim 9, wherein the second material is selected from the group consisting of titanium carbide, titanium nitride and silicon nitride.

12. The disc as claimed in claim 9, wherein the second material is a metal oxide.

13. The disc as claimed in claim 9, wherein the first material of which the blade is made is selected from the group consisting of titanium, titanium-based alloys and nickel-based alloys.

* * * * *